US012754859B1

(12) United States Patent
Pang et al.

(10) Patent No.: US 12,754,859 B1
(45) Date of Patent: Oct. 6, 2026

(54) I/O MANAGEMENT USING PAGE-LEVEL AGING

(71) Applicant: Dell Products L.P., Round Rock, TX (US)

(72) Inventors: Lixin Pang, Needham, MA (US); Rong Yu, West Roxbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/182,802

(22) Filed: Apr. 18, 2025

(51) Int. Cl.
*G06F 12/00* (2006.01)
*G06F 13/16* (2006.01)

(52) U.S. Cl.
CPC ...... *G06F 13/1642* (2013.01); *G06F 13/1621* (2013.01)

(58) Field of Classification Search
CPC ............. G06F 13/1642; G06F 13/1621; G06F 12/123; G06F 9/3855; G06F 3/0659
See application file for complete search history.

(56) References Cited

U.S. PATENT DOCUMENTS

2004/0267706 A1* 12/2004 Springer, Sr. ........... G06F 3/061
2019/0050157 A1* 2/2019 Anderson ............. G06F 3/0637
2023/0070397 A1* 3/2023 Esaka .................. G06F 3/0656

* cited by examiner

*Primary Examiner* — Shawn X Gu
(74) *Attorney, Agent, or Firm* — Daly, Crowley, Mofford & Durkee, LLP

(57) ABSTRACT

I/O requests, including write-pending requests, are managed using a page-level aging object rather than a collection of tracks (e.g., slices and slice objects). Page-level management includes a page-based aging object created as a container to manage the aging life cycle of write destage operations. I/O requests are assigned to a first collection of pending requests. The first collection is associated with a second collection, the page-based aging object. The second collection may be associated with a backend metadata page. The second collection is assigned to a destaging queue the pending requests are destaged according to the second collection.

20 Claims, 7 Drawing Sheets

I/O MANAGEMENT USING PAGE-LEVEL AGING

BACKGROUND

A distributed storage system may include a plurality of networked storage devices to provide data storage to a plurality of arrays. The plurality of storage devices and the plurality of arrays may be situated in the same physical location, or in one or more physically remote locations. The plurality of nodes and arrays may be coupled to the storage devices by a high-speed interconnect, such as a switch fabric.

When receiving input/output requests, destaging operations to a backend storage device include a framework that is based on the aging of a collection of tracks (slices or slice-based objects) to be written, which may be well suited for optimizing performance of disk write operations as well as improving write hits on the front end. One issue, however, is that backend slices are not aligned with their metadata pages thus coordinating multiple slice objects with metadata scheduling is not efficient, may be error-prone and may require complicated algorithms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements.

Reference numerals that are introduced in the specification in association with a drawing figure may be repeated in one or more subsequent figures without additional description in the specification in order to provide context for other features.

DETAILED DESCRIPTION

Figure 1:
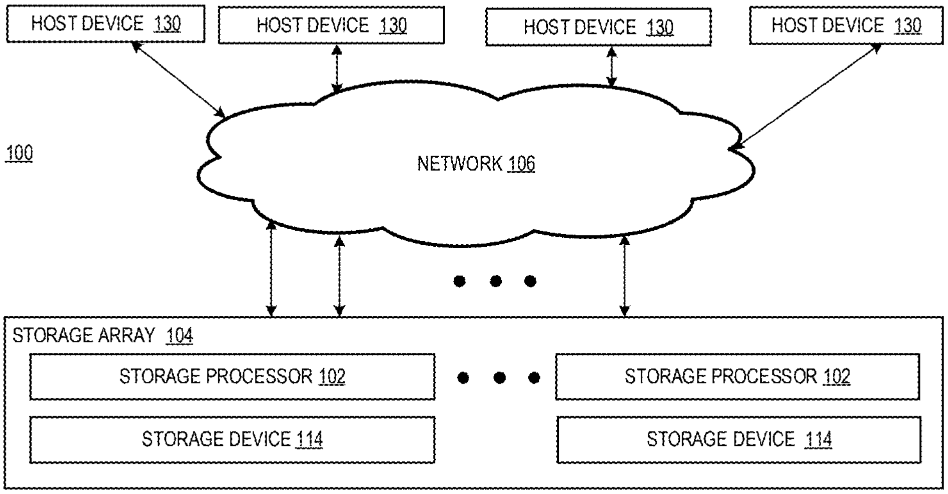
FIG. 1 is a block diagram of an illustrative storage system, according to aspects of the present disclosure.

FIG. 1 is a diagram of an example of a storage system 100, according to aspects of the disclosure. As illustrated, the system 100 may include a storage array 104, a communications network 106, and a plurality of host devices 130. The communications network 106 may include one or more of a fibre channel (FC) network, the Internet, a local area network (LAN), a wide area network (WAN), and/or any other suitable type of network. The storage array 104 may include a storage system, such as DELL/EMC Powermax™, DELL PowerStore™, and/or any other suitable type of storage system. The storage array 104 may include or be arranged with one or more node-pairs and a plurality of non-volatile memory storage devices 114. The storage devices may be configured in a RAID configuration. Each node of the node pairs may include one or more storage processors 102. Each of the storage processors 102 may be configured to receive Input/Output (I/O) requests from host devices 130 and execute the received I/O requests by reading and/or writing data to storage devices 114. Each of the host devices 130 may include a desktop computer, a laptop, a smartphone, an internet-of-things (IOT) device, and/or any other suitable type of computing device.

According to one aspect, each of storage devices 114 may be a non-volatile memory express (NVMe) drive. In another aspect, the storage devices may be solid-state drives (SSD). In some implementations, each of the storage devices 114 may be connected to the storage processors 102 via a Peripheral Component Interconnect Express (PCIe) connection. Each of the storage devices 114 may include a respective controller (not shown) and storage medium (not shown). The controller of each storage device 114 may include processing circuitry that is configured to perform various tasks, such as the retrieval and storage of data on the medium, wear leveling, error handling, garbage collection, as well as other functions. The medium may include an array of NAND memory cells and/or any other suitable type of storage medium.

In some implementations, any of the storage devices 114 may be internal to one of the storage processors 102 and coupled to the storage processor via an M.2 slot that is provided on the motherboard of that storage processor. Additionally, or alternatively, in some implementations, any of the storage devices 114 may be part of a disk array enclosure (DAE) and coupled to each of the storage processors 102 via a respective InfiniBand adapter of that storage processor. It will be understood that the present disclosure is not limited to any specific method for connecting storage devices 114 to storage processors 102.

Figure 2A:
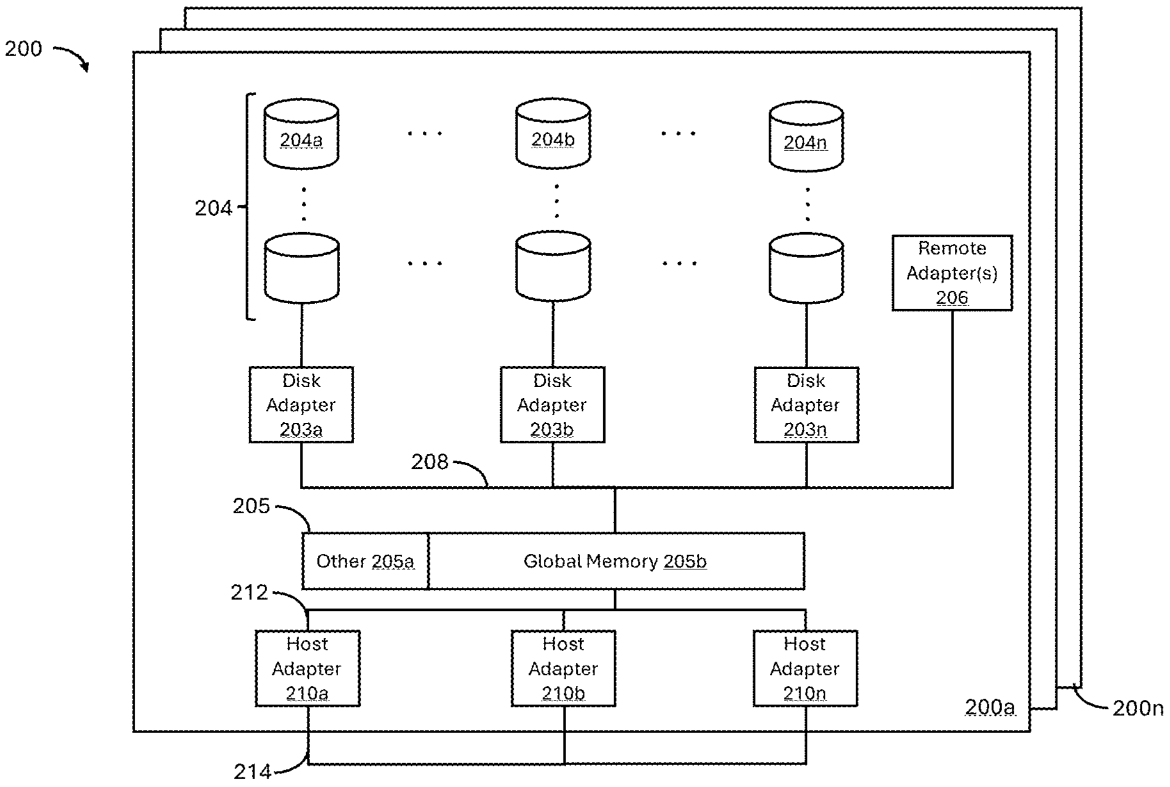
FIG. 2A is a block diagram of an example storage device, according to aspects of the present disclosure.

Referring to FIG. 2A, shown is an example of an embodiment of a storage array 200. Storage array 200 may be the same or substantially similar to the storage array 104 of FIG. 1. Included in the storage array 200 may be one or more arrays 200*a*-200*n*. Each of the arrays 200*a*-200*n* may be inter-connected (not shown). Additionally, the arrays 200*a*-200*n* may also be connected to host systems through any one or more communication connections 214 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the storage arrays 200. While this example, as described in more detail in following paragraphs, references the more detailed view of storage array 200*a*, it should be noted that a similar more detailed description may also apply to any one or more of the other elements, such as 200*n*, but have been omitted for simplicity of explanation. Each of the arrays 200*a*-200*n* may be resources included in an embodiment of the system 100 of FIG. 1 to provide storage services to, for example, host computer systems. It should be noted that the storage arrays 200 may operate as stand-alones or may also be included as part of a storage area network (SAN) that includes, for example, other components.

Each of the storage arrays, such as array 200*a*, may include a plurality of disk devices or volumes, such as the arrangement 204 including n groupings of disks or more generally, data storage devices, 204*a*-204*n*. In this arrangement, each of the n groupings of disks may be connected to a disk adapter 203*a*-203*n* ("DA") or director responsible for the backend management of operations to and from a portion of the disks 204. In the system 200*a*, a single DA, such as DA 203*a*, may be responsible for the management of a grouping of disks, such as grouping 204. According to one aspect, a backend DA may also be referred to as a disk controller. The DA may perform operations such as reading data from, and writing data to, the physical devices (e.g., physical storage devices also referred to as PDs) which are serviced by the DA.

Also shown in the storage array 200*a* is a remote adapter (RA) 206. The RA 206 may be hardware, including a processor used to facilitate communication between data storage systems, such as between two of the same or different types of data storage systems.

The storage array 200*a* may also include one or more host adapters ("HAs") or directors 210*a*-210*n*. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. According to one aspect, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and memory 205. An embodiment, for example, may use one or more internal buses and/or communication modules. For example, a global memory portion 205*b* may be used to facilitate data transfers and other communications between the DAs, HAs and RAs in a data storage system. In one embodiment, the DAs 203*a*-203*n* may perform data operations using a cache that may be included in the global memory 205*b*, for example, in communications with other disk adapters or directors, and other components of the storage array 200*a*. The other memory portion 205*a* may be used in connection with other designations that may vary in accordance with each embodiment.

The storage array 200*a* as described herein, or a particular device thereof, such as a disk, should not be construed as a limitation. Other types or configurations of data storage systems, as well as processors and hardware controlling access to these particular devices, may also be included in an embodiment.

According to one aspect of the present disclosure, host systems provide data and access control information through channels to the storage systems, and the storage arrays and storage systems may also provide data to the host systems also through the channels. The host systems may not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

According to one aspect, the DA may perform I/O operations on a disk drive. Data residing on a disk drive may be accessed by the DA following a data request in connection with I/O operations that other directors originate. It should also be noted that a DA may also be a controller providing access to external physical drives or storage devices located on one or more external data storage systems rather than local physical drives located in the same physical storage system as the DA (such as illustrated in FIG. 2A).

Figure 2B:
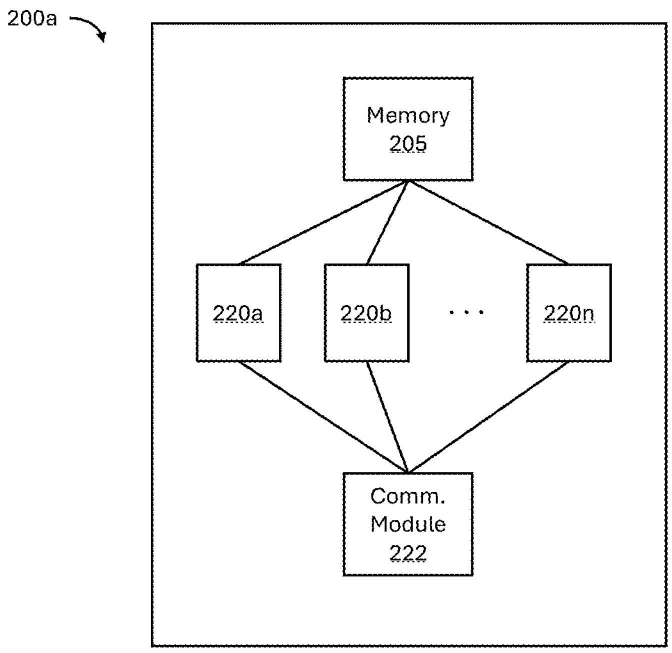
FIG. 2B is a block diagram of a representation of logical internal communications between directors and memory of a storage system, according to aspects of the present disclosure.

Referring to FIG. 2B, shown is a representation of the logical internal communications between the directors and memory included in a storage array, for example array 200*a*. The array 200*a* may include a plurality of directors 220*a*-220*n* coupled to the memory 205. Each of the directors 220*a*-220*n* may represent one of the HAs, RAs, or DAs that may be included in an array. Each of the directors may be, for example, a processor or a printed circuit board that includes a processor and other hardware components. In an embodiment disclosed herein, there may be up to sixteen directors coupled to the memory 205. Other embodiments may use a higher or lower maximum number of directors that may vary. For example, an embodiment in accordance with techniques described herein may support up to one hundred twenty-eight directors per data storage array. The representation of FIG. 2B also includes an optional communication module 222 that may provide an alternative communication path between the directors 220*a*-220*n*. Each of the directors 220*a*-220*n* may be coupled to the communication module 222 so that any one of the directors 220*a*-220*n* may send a message and/or data to any other one of the directors 220*a*-220*n* without needing to go through the memory 205.

The communication module 222 may be implemented using conventional MUX/router technology where a sending one of the directors 220*a*-220*n* provides an appropriate address to cause a message and/or data to be received by an intended receiving one of the directors 220*a*-220*n*. In addition, a sending one of the directors 220*a*-220*n* may be able to broadcast a message to all of the other directors 220*a*-220*n* at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than having a separate control communications fabric such as illustrated in FIG. 2B.

Aspects of the present disclosure provide concepts, techniques and structures for enhancing management of I/O requests and in particular, improving destaging operations from global memory to backend storage devices, including RAID-configured arrays. The present disclosure provides a solution in which I/O requests, including write-pending requests, are managed using a page-level aging object rather than a collection of tracks (e.g., slices and slice objects). With aging objects managed at metadata page level, existing slice-based write destage can be integrated seamlessly into the new model. Enhancement and optimization to coordinate aged write destaging with metadata scheduling may be implemented naturally on top of this infrastructure as the foundation of an aging container is metadata page-based. As described herein, page-based aging object management may provide a more consistent and long-term view of I/O patterns, which may be beneficial to manage the timing of I/O processing with optimized performance.

According to one or more aspects, I/O requests may be assigned to a first collection of pending requests, sometimes referred to herein as slice objects. The first collection is associated with a second collection, the page-based aging object. The second collection may be associated with a backend metadata page. The second collection is assigned to a destaging queue the pending requests are destaged according to the second collection.

According to one aspect, a page-based aging object, referred to herein as a PABA or PABA object, may be created as a container to manage the aging life cycle of write destage operations. Each PABA object may be responsible for managing the write destage of all tracks listed in a metadata page key of the object. Any write to a backend track listed in the metadata page will be added to the PABA object and managed according to that object.

Figure 3:
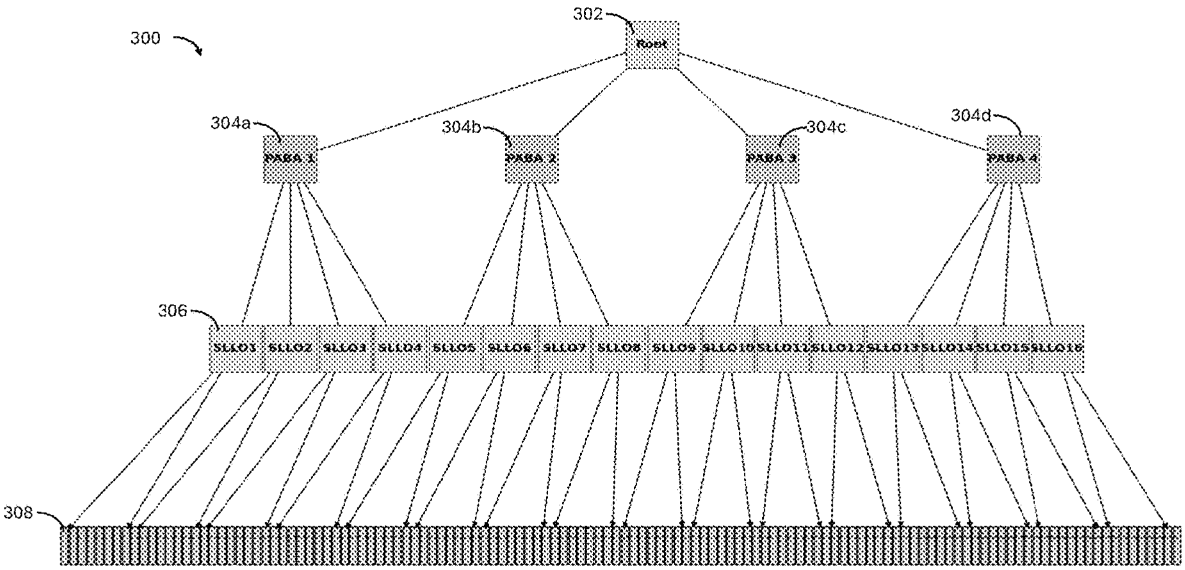
FIG. 3 is a block diagram of a page-based aging hierarchy, according to aspects of the present disclosure.

FIG. 3 is a diagram of a PABA object aging hierarchy 300 according to one or more aspects of the disclosure. As shown, a root device 302, such as a storage device or volume, may be associated with one or more PABA objects, such as objects 304*a*, 304*b*, 304*c*, and 306*d*, collectively referred to as PABA objects 304. Each PABA object 304 may include one or more collections 306, sometimes referred to as slice objects or super slice objects. Each collection 306 may include one or more tracks 308. According to one aspect, a root device 302 may include sixteen slice objects 306 and each slice object 306 may include forty-eight tracks. Accordingly, each PABA object 304 may include, or cover, seven hundred sixty-eight tracks, with each track listed in a backend metadata page.

In this manner, each track 308 that is subject to a write request may be associated with a PABA object 304 under which the aging procedure may be managed. As described herein, the aging of the write-pending requests may be managed by packaging the write requests for all the tracks 308 listed in the backend metadata page. Advantageously, such a hierarchy and again management may maintain slice-based destaging, however the destaging may now be done according to the metadata pages and in coordination with metadata scheduling.

According to one aspect, a data structure, such as a B-tree, may be used to map each write request for a track to a PABA object 304 using a key. According to one aspect, the key for creating and looking up PABA objects 304 in the B-tree may be calculated using a track number and the size of the metadata page. For example, if each backend metadata page contains seven hundred sixty-eight tracks, or track identifiers, a page number may be generated by dividing the track number by seven hundred sixty-eight. This page number may be used as a key to lookup PABA objects 304 in the B-Tree. If the page umber/key is not found in the B-tree, a new PABA object 304 may be created.

According to one or more aspects, the PABA objects 304 may be defined or include a number of attributes. In a distributed storage system, like those described herein, a PABA owner may include or be one of the nodes in a defined cluster in order to minimize the complexity to updating and coordinating between the nodes. The PABA object 304 may further include attributes such as a total number of write-pending tracks, a first and last update time of write-pending tracks, a last write destage time, a number of write destages and/or the total number of write-pending updates. The PABA object 304 may also include metadata page update and scheduling information, such as last access time, last update time, or the like. The object may further include a slice mask to manage which slice objects 306 have pending writes. For example, when a bit is set in the slice mask, a slice object lookup key may be calculated. Thus, the mask may be used as a link to all slice objects 306 with pending writes. A recently destaged slice mask may also indicate which slice objects 306 have recently been destaged.

Figure 4:
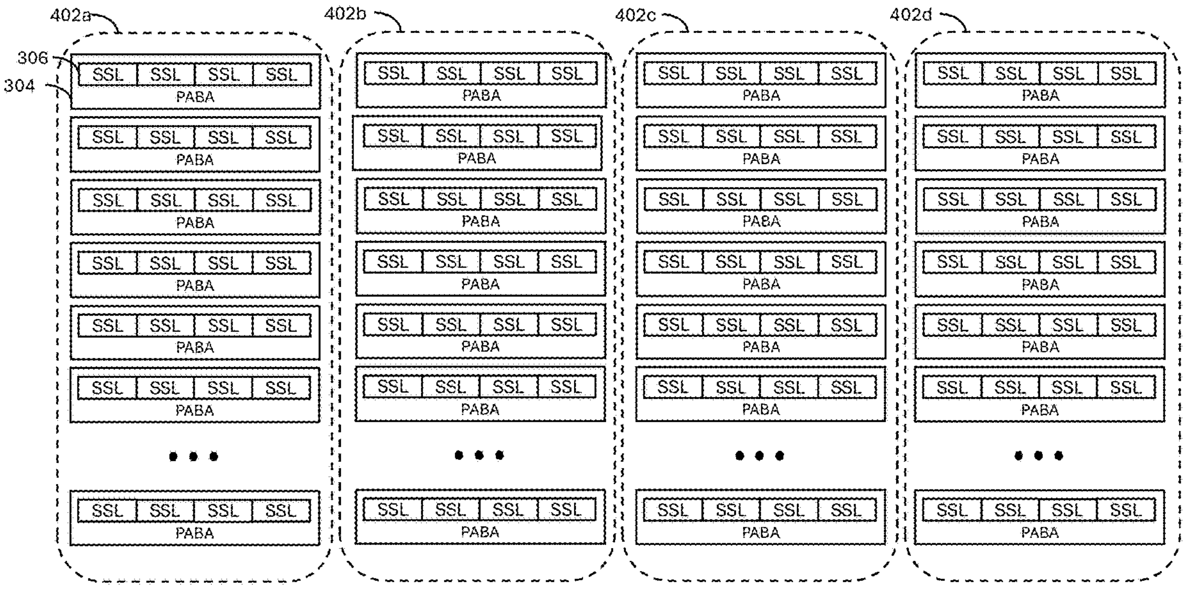
FIG. 4 is a block diagram of one or more page-based aging queues, according to aspects of the present disclosure.

According to aspects of the present disclosure, the ageing of I/O requests, including write-pending requests, may be managed according to the PABA objects 304. FIG. 4, in which like reference numerals identify similar or identical elements, is a block diagram of one or more page-based aging queues, such as queues 402*a*, 402*b*, 402*c*, and 402*d*, collectively referred to as aging queues 402. Each PABA object 304 may manage the aging process of all tracks contained therein, all of which are listed in the same backend metadata page. For example, each PABA object 304 may manage the write requests for seven hundred sixty-eight tracks. Within each PABA object 304, write-pending tracks may be further grouped according to a collection of slices or slice objects 306. According to one aspect, slice object 306 may be the basic unit for write destage operations.

According to one aspect, each PABA object 304 upon creation may be added to one of a list of aging buckets, such as queues 402. The determination of which bucket or queue 402 the PABA object 304 is added to may depend on the PABA object attributes and system level parameters, including for example a write-pending level. Each queue 402 may processed, in one aspect, according to a first-in-first-out (FIFO) procedure, ordered by the last update time. For each new or updated write operation in the PABA object 304, the last time updated for that object is calculated and a new queue 402 may be assigned.

According to one aspect, PABA object aging time may be based on a weighted aging time for all write-pending slice objects. Slice object aging time, in turn, may be based on properties of all write-pending tracks in the slice as well as system resource and environmental factors.

According to aspects of the present disclosure, PABA objects 304 and the respective aging queues 402 may be periodically or continuously scanned to set or update destaging priorities, including picking PABA objects 304 with associated slice objects 306 that may have expired or expiring aging times. In one aspect, aging PABA object management may be flexible and may be completed according to one of two approaches, chosen dynamically at runtime, depending on system status and IO patterns. A first approach may include destaging the entire PABA object 304. When a PABA aging time has expired, the PABA object 304 may be moved out of FIFO bucket or queue 402 and all slice objects 306 contained in the PABA object 304 may be scheduled for write destage. The write destage module may enumerate all the slice objects 306 within PABA object 304 and destage each slice object 306 in sequence.

In another aspect, a partial destage of the PABA object 304 may be completed. For example, when a PABA aging time expires, discrete slice objects 306 (i.e., not all slice objects 306 within the PABA 304) with high urgency may be identified. Such slice objects 306 may be selected by looking at the slice object aging time and sending those slice objects to be destaged. The slice mask for the PABA object containing the identified slice object may be updated and the recently-destaged slice mask may be updated. As only a portion of the slice objects 306 are picked up for write destage, the PABA object 304 may remain in the same aging queue 402, but with a modified priority and position in the FIFO process. When the last slice object 306 in the PABA object 304 is done with write destage, the PAGA object 304 may set a summary flag or indicator in the slice object to optimize metadata scheduling.

Figure 5:
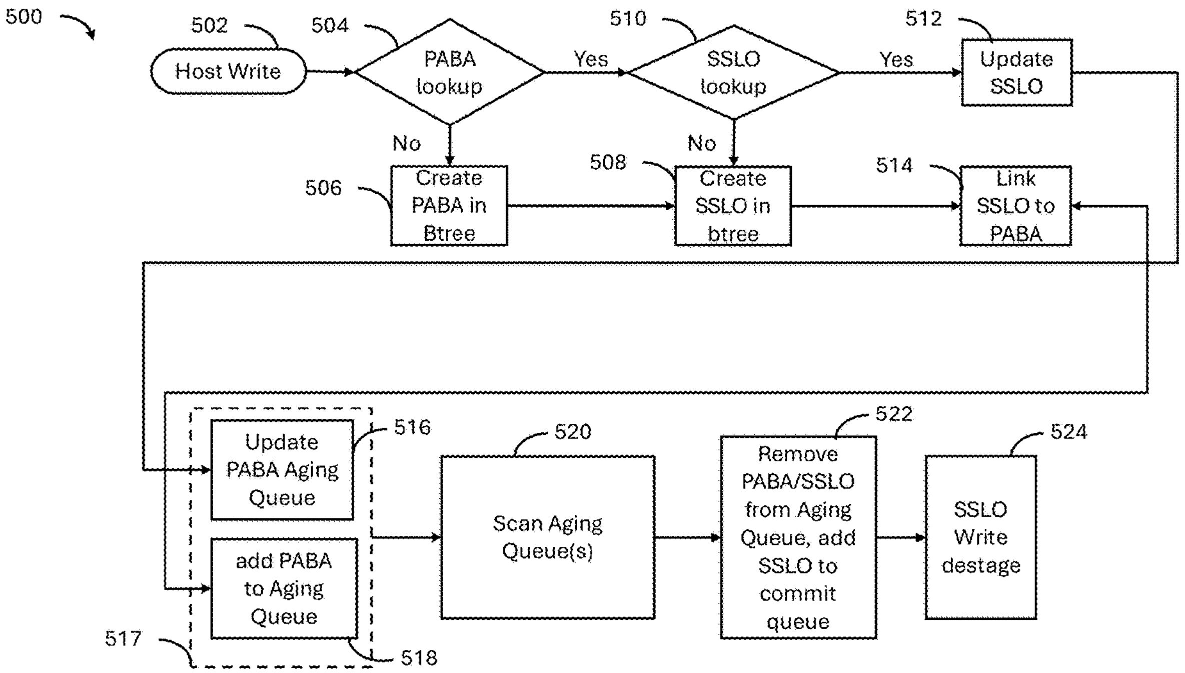
FIG. 5 is a flow diagram of a page-based aging method, according to aspects of the present disclosure.

FIG. 5 is a flow diagram of a method 500 of managing destaging operations according to one or more aspects of the present disclosure. As shown in block 502 a host write request for a track may be received. In block 504 a PABA object lookup may be performed to determine if the track is identified in an existing PABA object. If the track is not found and/or there is no PABA object present, a new object may be created, shown in block 506. If a PABA object is found, a slice object (SSLO) lookup may be done to determine if the track is associated with an existing slice object, shown in block 510. If no slice object is found, as shown in block 508, a slice object may be created. The newly created slice object may be linked to a PAGA object, shown in block 514. As shown in block 518, the PABA object may then be added to an aging queue, shown as block 517. If the slice object is found, the object may be updated to reflect the incoming write request, shown in block 512. The aging queue 517 in which the PABA object is located may then be updated, shown in block 516.

According to one aspect, as shown in block 520, the aging queues may be scanned periodically to identify and select candidate PABA and slice objects for destaging. As described herein, PABA objects and slice objects may be identified based on object attributes, including aging time metrics, as well as system resources and environmental factors. Once identified, depending on whether an entire PABA object or a portion of the slice objects within the PABA object is to be destaged, those objects may be removed from the aging queue, shown in block 522, and placed in a commit queue. As shown in block 524, the slice objects are destaged to the backend device.

Figure 6:
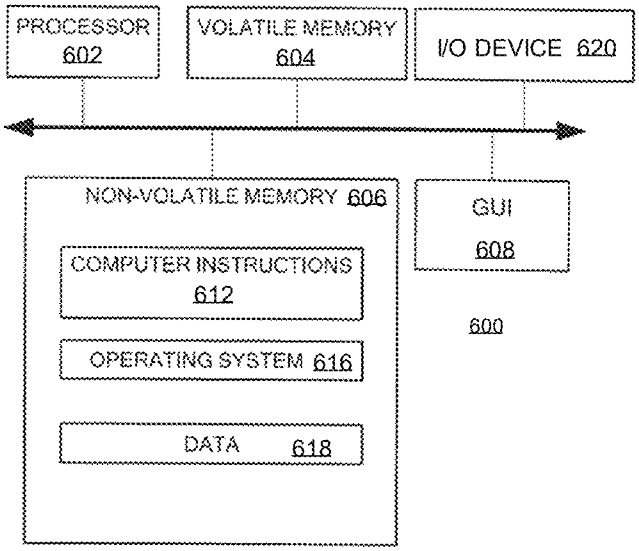
FIG. 6 is a block diagram of a processing device on which methods and processes disclosed herein can be implemented, according to some embodiments of the disclosure.

Referring to FIG. 6, in some embodiments, a computing device 600 may include processor 602, volatile memory 604 (e.g., RAM), non-volatile memory 606 (e.g., a hard disk drive, a solid-state drive such as a flash drive, a hybrid magnetic and solid-state drive, etc.), graphical user interface (GUI) 608 (e.g., a touchscreen, a display, and so forth) and input/output (I/O) device 620 (e.g., a mouse, a keyboard, etc.). Non-volatile memory 606 stores computer instructions 612, an operating system 616 and data 618 such that, for example, the computer instructions 612 are executed by the processor 602 out of volatile memory 604. Program code may be applied to data entered using an input device of GUI 608 or received from I/O device 620.

As disclosed herein, the concepts, techniques, and structures provide for a practical architecture and application that aligns in scope RAID-based write destage objects with page-based metadata. The systems described herein leverage page-based write destage aging with slice based write destage to provide a number of advantages. Optimized write destage may be coordinated with page-based metadata scheduling. A complete and centralized view of all metadata pages in use are associated with write-pending objects, which may be critical for system performance tuning and optimization. Owner based PABA objects may help to simplify metadata scheduling as well as maintaining I/O sequence management during write destage. A consistent and long-term view of I/O patterns within each PABA object and neighboring PABA objects may be realized, helping to further optimize write destage timing and algorithm.

In some aspects or embodiments, the term "I/O request" or simply "I/O" may be used to refer to an input or output request. In some embodiments, an I/O request may refer to a data read or write request. At least some of the steps discussed with respect to FIGS. 1-5 may be performed in parallel, in a different order, or altogether omitted.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term "vector" refers to a sequence of numbers (and/or other elements). The phrase "the element having index i" refers to the i-th element in the sequence. For example, if i=1, the phrase i-th element in the sequence would refer to the first element in the sequence, if i=2, the phrase i-th element in the sequence would refer to the second element in the sequence, and so forth.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

What is claimed is:

1. A method comprising:
- receiving an input/output (I/O) request;
- assigning the I/O request to a first collection of pending requests;
- associating the first collection with a second collection, the second collection associated with a backend metadata page;
- assigning the second collection to a destaging queue; and
- destaging the pending requests according to the second collection.

2. The method of claim 1 further comprising scanning the destaging queue for aging data of the second collection, wherein the pending requests are destaged according to the aging data.

3. The method of claim 2 wherein the aging data includes an aging time of the pending requests in the first collection.

4. The method of claim 1 wherein the destaging queue is a first-in-first-out (FIFO) queue.

5. The method of claim 4 wherein the FIFO queue is ordered by a last update time.

6. The method of claim 1 further comprising creating the second collection upon a first reference to the backend metadata page.

7. The method of claim 1 further comprising deleting the second collection after destaging all pending requests of the first collection.

8. The method of claim 1 wherein the first collection comprises a plurality of tracks and the second collection comprises a plurality of first collections.

9. The method of claim 1 wherein one or more second collections comprise a B-tree data structure.

10. A system comprising:
- a memory; and
- a processor configured to perform the operations of:
- receiving an I/O request;

assigning the I/O request to a first collection of pending requests;

associating the first collection with a second collection, the second collection associated with a backend metadata page;

assigning the second collection to a destaging queue; and destaging the pending requests according to the second collection.

11. The system of claim 10 further comprising scanning the destaging queue for aging data of the second collection, wherein the pending requests are destaged according to the aging data.

12. The system of claim 11 wherein the aging data includes an aging time of the pending requests in the first collection.

13. The system of claim 10 wherein destaging queue is a first-in-first-out (FIFO) queue.

14. The system of claim 13 wherein the FIFO queue is ordered by a last update time.

15. The system of claim 10 further comprising creating the second collection upon a first reference to the backend metadata page.

16. The system of claim 10 further comprising deleting the second collection after destaging all pending requests of the first collection.

17. The system of claim 10 wherein the first collection comprises a plurality of tracks and the second collection comprises a plurality of first collections.

18. The system of claim 10 wherein one or more second collections comprise a B-tree data structure.

19. A non-transitory computer-readable medium storing one or more processor-executable instructions, which when executed by a processing circuitry, further cause the processing circuitry to perform the operations of:

receiving an I/O request;

assigning the I/O request to a first collection of pending requests;

associating the first collection with a second collection, the second collection associated with a backend metadata page;

assigning the second collection to a destaging queue; and destaging the pending requests according to the second collection.

20. The non-transitory computer-readable medium of claim 19 further comprising instructions for scanning the destaging queue for aging data of the second collection, wherein the pending requests are destaged according to the aging data.

* * * * *